Sept. 3, 1968  T. A. CRAWFORD  3,399,421
SANITARY SEAL FOR CASTERS
Filed March 22, 1965
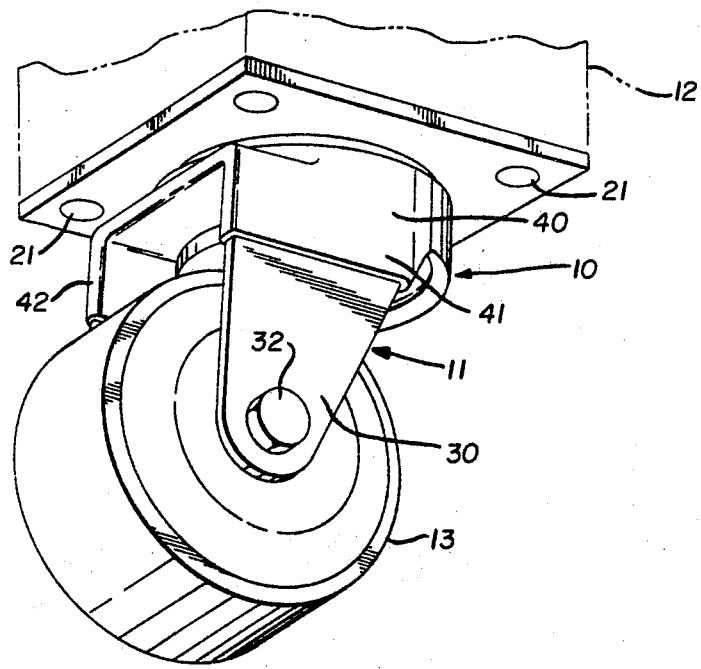
FIG. 1
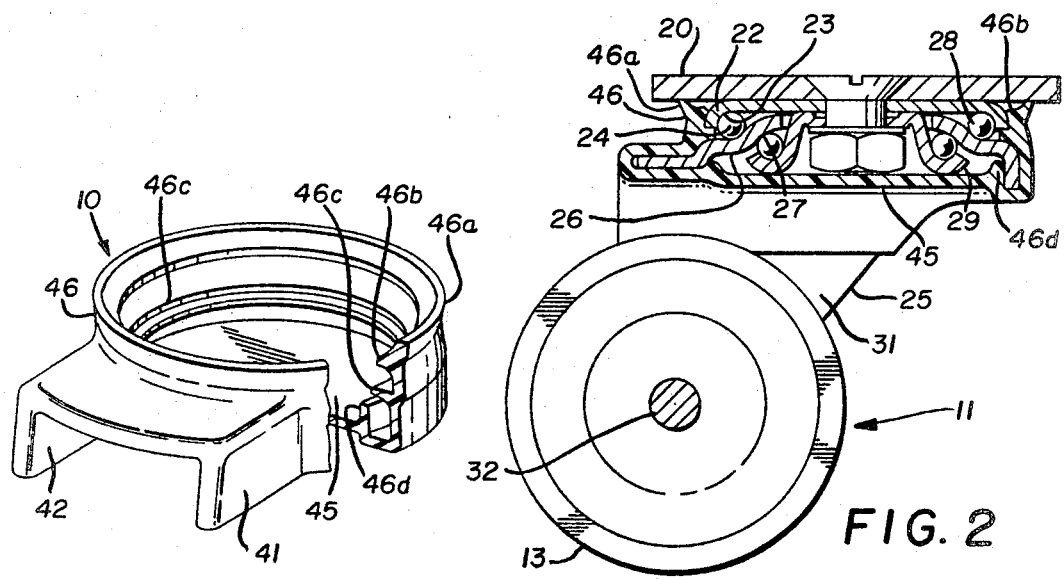
FIG. 3
FIG. 2
INVENTOR.
THOMAS A. CRAWFORD
BY Freeman & Taylor
ATTORNEYS

United States Patent Office 3,399,421
Patented Sept. 3, 1968

3,399,421
SANITARY SEAL FOR CASTERS
Thomas A. Crawford, 606 Nome Ave.,
Akron, Ohio 44320
Filed Mar. 22, 1965, Ser. No. 441,701
4 Claims. (Cl. 16—26)

ABSTRACT OF THE DISCLOSURE

A flexible slip-on cover for sealing the raceways of a double ball bearing caster including a cup shaped body portion adapted to fit over the peripheries of said raceways and be retained thereon. The body also including integral projecting sleeves which fit over the legs of the base of the caster.

---

This invention relates to the art of casters and in particular has reference to new and improved sealing means designed to improve the over-all sanitary properties of swivel casters.

Swivel casters have long been known in the prior art as a most satisfactory device for facilitating the free movement of carts, beds and the like across a floor surface. It is also known that the acceptability of casters is due in part to their free and easy swiveling movement which is maintained by regular application of a lubricant such as grease or the like.

In recent years, however, the presence of such lubricating mediums has become subject to objection where strict sanitary regulations are enforced, with such objection arising because of the fact that the lubricant employed creates a vermin trap that precludes attainment of proper sanitary conditions.

It is, of course, impossible to dispense with the use of such lubricating medium, and at the present time all efforts at sealing off the lubricant area have been unsuccessful due to either the cost factor encountered or the impracticability of the seal proposed. In this regard it must also be remembered that the casters in question are subject to great wear, must be frequently serviced and/or replaced so that any sealing means that is to be employed must meet the requirement of permitting ready access for servicing or replacement purposes.

It has been discovered that all of the aforementioned requirements can be complied with by providing a one-piece "slip-on" type of flexible cover that snugly encases the movable components of the caster so as to present a lubricant seal that does not impair the operability of the caster, but yet seals lubricant in while sealing dirt and vermin out.

Further, by use of a unitary type of slip-on caster cover it has been found that the cost of the seal is materially reduced because of the low cost of the material involved and further because the cover in question can be installed following manufacture of the caster with no modification of the caster per se being required in order to receive the sealing cover in question.

Production of an improved, unitary "slip-on" type of sealing cover for swivel casters accordingly becomes the principal object of this invention, with other objects becoming more apparent upon a reading of the following brief specification, considered and interpreted in the light of the accompanying drawings.

Of the drawings:

FIGURE 1 is a perspective view showing the improved sealing cover secured to a swivel caster.

FIGURE 2 is an elevational view wherein the cover is broken away and the caster is shown in section to illustrate the operating details thereof.

FIGURE 3 is a perspecitve view of the cover viewed alone and being partly broken away for clarity.

Referring now to the drawings and in particular to FIGURE 1, the improved caster cover, generally designated by the numeral 10, is shown slipped over a swivel caster 11 that is in turn mounted to the surface 12 with the arrangement being such that the caster can move in any selected direction either by (1) rotation of wheel 13 (2) or by swiveling of the caster 11 around its axis, as is well known in the prior art.

Accordingly, and first referring to FIGURE 2, the caster 11 includes the usual base or top plate 20 having apertures 21, 21 that facilitate mounting with respect to surface 12. An upper ball race cup 22 is fixed with respect to the plate 20 so as to serve as one wall of an upper raceway 23 within which the usual ball bearings 24, 24 can be employed. The movable portion of the caster 11 is shown including the usual fork member that has a main body portion 25 that in turn defines a contoured shoulder 26 that serves as a wall of both the upper raceway 23 and the lower raceway 27, with balls 28, 28 being received in the raceway 27 and being retained in place therein by a lower ball race cup or plate 29 as shown in FIGURE 3, with the arrangement being such that the caster 25 moves relatively of the base 20 by virtue of the ball bearings provided in the just described upper and lower raceways 23 and 27.

It will also be noted from FIGURE 1 that a pair of depending parallel legs 30 and 31 extend downwardly from the body 25 with the projecting ends of such legs receiving the usual support bolt 32 around which wheel 13 can be journaled in known fashion.

The sealing cover 10 is preferably molded for snug reception with respect to external surfaces of body 25, cups 22 and 29 and legs 30 and 31, with the cover 10 preferably being made of flexible material such as vinyl plastic so as to permit distortion or flexing thereof for easy installation and/or removal of the same with respect to the swivel caster 11.

In this regard and referring to FIGURE 1, the cover 10 in essence, includes a base portion 40 and projecting leg portions 41 and 42, with these component portions being preferably integral and with the base portion 40 having substantially the configuration of a jar lid while the leg portions 41 and 42 are contoured for snug reception over the legs 30 and 31 as clearly shown in FIGURE 1 of the drawings.

It has been previously indicated that the base portion 40 of the cover 10 simulates a "jar lid" in cross sectional configuration and, accordingly, and as best shown in FIGURE 3, the same includes a flat cover portion 45 and an upturned edge portion 46, with the cover 45 completely enclosing and sealing off the lower raceway 27 while the edge 46 seals off the upper raceway 23. Preferably, and as shown in FIGURE 3, the extreme projecting end of edge 46 is tapered to a knife edge, as at 46a, to permit free movement during sealing engagement with the plate 20, with a bulbous portion 46b optionally being provided for the purpose of retaining the cover 10 in place on caster 11. Additionally, a sealing rib 46c projects radially inwardly from edge 46 for the purpose of being received in the space between cup 22 and body 25, with such rib serving the dual function of providing additional sealing at this point while simultaneously serving to position the edge 46a with respect to member 20 so as to permit free movement.

While the rib 46c seals off the upper raceway 23 as just described, it is also apparent that a complete sealing off must be effectuated with respect to the lower raceway 27 and to this end the cover 10 further includes an axially projecting tapered rib 46d that is provided at the juncture of base 45 and edge 46 as clearly shown in FIGURES 2 and 3 of the drawings.

Preferably both the ribs 46c and 46d are precision contoured to permit proper sealing while yet permitting relative movement of the fork 25 relatively of the mounting plate 20.

In use or operation of the improved sealing cover it will first be assumed that the caster mechanism has been assembled and that the wheel 13 has not been positioned in place.

At this time it is merely necessary that the user insert the legs 30 and 31 through the sleeve portions 41 and 42 respectively of cover 10 with such insertion resulting in some deformation of the cover 10. As the cover is moved downwardly the sealing edge 46 thereof may be positioned in encircling relationship to the periphery of the upper ball race cup 22 so as to assume the position of FIGURE 2 wherein sealing engagement exists with respect to the mounting plate 20.

At this time and as has been indicated, the upper and lower raceways 23 and 27 are completely sealed off from the exterior of the swivel by ribs 46c and 46d so that dirt is prevented from entering the raceways while lubricating medium is also prevented from leaving the same.

When the sealing cover 10 is installed it is believed apparent that the same will move with the fork portion 25 and thus will move relatively of the members 20 and 22 while yet being in sealing engagement therewith.

Following installation of the sealing cover the wheel may be readily installed so that the caster is ready for use.

In the event it is desired to remove the sealing cover it is merely necessary to remove the wheel and reverse the installation process above described.

In actual practice it has been found most advantageous to mold the cover 10 on a dipping form whose contour corresponds to that of the caster in question, with such arrangement permitting duplication of the caster exterior on the interior of the mold cover so that precision fitting is achieved.

While a full and complete description of the invention has been set forth in accordance with the dictates of the patent statues it is to be understood that the invention is not intended to be limited to the specific embodiment herein shown. Thus, the concept of contoured sealing between relatively movable area is envisioned under the broad form of the invention herein described. Thus, for example, the using of a dipping form corresponding to the product to be sealed is contemplated within the scope of this invention.

As a representative material adapted for satisfactory usage, attention is directed to plastic composition known as polyvinylchloride and being a vinyl resin product manufactured by the B.F. Goodrich Company under the Trademark "Geon."

It is believed apparent that other equivalent materials could be employed, provided that the same had the flexibility to permit installation as above noted.

Accordingly, modifications of the invention may be resorted to without departing from the spirit hereof or the scope of the appended claims.

What is claimed is:
1. In combination;
    (A) a swiveling caster having a plurality of ball bearing raceways and projecting mounting legs;
    (B) a flexible cover adapted to be slipped over said mounting legs into covering relationship with said raceways
        (1) whereby said raceways are sealed against
            (a) the entrance of foreign objects
            (b) the emission of lubricating material;
    (C) said cover having
        (1) a base portion with a molded innersurface contoured for snug reception about said raceways, and
        (2) a pair of projecting sleeves molded internally for snug reception about said projecting legs.
2. A slip on cover for use with a swivel caster having a base, a plurality of ball bearing raceways and a pair of projecting legs, comprising;
    (A) a flexible cover
        (1) of unitary construction
        (2) having a base of cup shaped configuration and
        (3) a pair of parallel hollow sleeves projecting from the bottom of said cup;
    (B) said base of said cover being adapted to fit snugly over said ball bearing raceways; and
    (C) said projecting sleeves being adapted to fit snugly over said projecting legs.
3. The device of claim 2 further characterized by the presence of
    (A) gripping means disposed on the interior surface of said base of said cover and adapted to coact with said raceways and said base to retain said cover in covering relationship therewith.
4. The device of claim 3 further characterized by the fact that
    (A) said raceways are spaced from each other and from said base; and
    (B) said gripping means include ribs projecting from the interior of said base and being adapted to engage the spaces between said base of said caster and said raceways and between said raceways
        (1) whereby said cover is retained in covering relationship to said caster.

References Cited

UNITED STATES PATENTS

| | | | |
|---|---|---|---|
| 2,742,663 | 4/1956 | Meadows | 16—46 |
| 2,787,804 | 4/1957 | Noelting et al. | 16—21 |
| 3,103,387 | 9/1963 | Saxenberg | 16—46 |

BOBBY R. GAY, *Primary Examiner.*

D. I. TROUTMAN, *Assistant Examiner.*